US009653958B2

(12) United States Patent
Patel et al.

(10) Patent No.: US 9,653,958 B2
(45) Date of Patent: May 16, 2017

(54) ROTOR WEDGE WITH ARMS

(71) Applicant: Hamilton Sundstrand Corporation, Charlotte, NC (US)

(72) Inventors: Dhaval Patel, Loves Park, IL (US); Eric A. Brust, Machesney Park, IL (US); Brady A. Manogue, Beloit, WI (US); Kevin J. Koester, Winnebago, IL (US); Glenn W. Hufstedler, Loves Park, IL (US); Shaun Maconaghy, Shabbona, IL (US); Christine Lynn Ooyen, Winnebago, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 181 days.

(21) Appl. No.: 14/598,806

(22) Filed: Jan. 16, 2015

(65) Prior Publication Data

US 2016/0211716 A1 Jul. 21, 2016

(51) Int. Cl.
*H02K 3/48* (2006.01)
*H02K 3/34* (2006.01)
*H02K 1/06* (2006.01)
*H02K 3/52* (2006.01)

(52) U.S. Cl.
CPC .................... *H02K 3/527* (2013.01)

(58) Field of Classification Search
CPC .................... H02K 3/487; H02K 1/28
USPC ... 310/214, 216.082, 215, 216.058, 216.125, 310/216.126
See application file for complete search history.

(56) References Cited

U.S. PATENT DOCUMENTS

| 2,945,140 | A | | 7/1960 | Drabik |
| 4,184,091 | A | * | 1/1980 | Khutoretsky .......... H02K 3/487 310/214 |
| 6,882,079 | B2 | | 4/2005 | Kilpatrick et al. |
| 6,979,929 | B2 | | 12/2005 | Tornquist et al. |
| 8,018,114 | B2 | | 9/2011 | Rasmussen et al. |
| 8,269,393 | B2 | | 9/2012 | Patel et al. |
| 8,853,911 | B2 | | 10/2014 | Lemmers, Jr. |

(Continued)

FOREIGN PATENT DOCUMENTS

| EP | 2713482 A2 * | 4/2014 | ............ H02K 3/487 |
| WO | WO2007/146246 A2 | 12/2007 | |
| WO | WO2015/034514 A1 | 3/2015 | |

OTHER PUBLICATIONS

Extended European Search Report, for European Patent Application No. 16151108.4, dated May 4, 2016, 11 pages.

*Primary Examiner* — Jose Gonzalez Quinones
(74) *Attorney, Agent, or Firm* — Kinney & Lange, P.A.

(57) ABSTRACT

A wedge for use in a generator rotor includes a wedge body extending for an axial length and having a generally triangular cross-section, a first side of the wedge body extending for the axial length of the wedge body, a second side of the wedge body extending for the axial length of the wedge body and having a generally flat surface, a third side of the wedge body extending for the axial length of the wedge body and having a generally flat surface, a first arm extending circumferentially away from the wedge body at an interface between the first side and the second side and extending axially along the wedge body, and a second arm extending circumferentially away from the wedge body at an interface between the first side and the third side and extending axially along the wedge body.

18 Claims, 3 Drawing Sheets

(56) References Cited

U.S. PATENT DOCUMENTS

| | | |
|---|---|---|
| 2004/0263019 A1* | 12/2004 | Buchan .................. H02K 3/527 310/214 |
| 2007/0090701 A1 | 4/2007 | Down et al. |
| 2010/0133946 A1 | 6/2010 | Lemmers, Jr. et al. |
| 2010/0244614 A1* | 9/2010 | Rasmussen ............ H02K 3/487 310/214 |
| 2010/0320860 A1 | 12/2010 | Patel et al. |
| 2011/0133579 A1 | 6/2011 | Vanderzyden |
| 2012/0126643 A1 | 5/2012 | Zhong |

* cited by examiner

ROTOR WEDGE WITH ARMS

BACKGROUND

The present disclosure relates to a generator and, in particular, to a main rotor of a generator.

Typically, a generator includes a rotor having a plurality of windings (made up of electrically conductive wires) wrapped around elongated poles on a rotor core. The rotor is driven to rotate by a source of rotation: a prime mover such as a turbine rotor. The generator rotor rotates in proximity to a stator, and the rotation of the rotor, which is an electromagnet due to electricity running through the windings, induces voltage in the stator. The voltage in the stator can be applied to external electrical components, providing electrical power to those components. During operation, the generator rotor rotates at very high speeds, creating centrifugal forces on the poles and windings that may cause the wires of the windings on the poles to become displaced.

In order to prevent movement of the windings, improve the strength and reliability of the generator rotor, and minimize the amount of imbalance in the generator rotor that may result from movement of the windings, wedges may be inserted in between neighboring poles on the rotor core. The wedges serve as a physical barrier between poles to prevent movement of the wires of the windings and stiffen the whole rotor structure by provide a support structure between poles. Because the generator rotor rotates at very high speeds, it is important that the wedges are light (i.e., low mass) and durable while also being simple to construct and install.

SUMMARY

A wedge for use in a generator rotor includes a wedge body extending for an axial length and having a generally triangular cross-section, a first side of the wedge body extending for the axial length of the wedge body, a second side of the wedge body extending for the axial length of the wedge body and having a generally flat surface, a third side of the wedge body extending for the axial length of the wedge body and having a generally flat surface, a first arm extending circumferentially away from the wedge body at an interface between the first side and the second side and extending axially along the wedge body, and a second arm extending circumferentially away from the wedge body at an interface between the first side and the third side and extending axially along the wedge body.

A rotor for a generator includes a shaft, a rotor core radially outward from the shaft and having a plurality of poles spanning axially along the rotor core, a plurality of windings wrapped around each of the plurality of poles, and a plurality of wedges with each wedge being positioned between two adjacent poles of the plurality of poles. Each wedge includes a wedge body having a generally triangular cross-section that extends axially along the length of the rotor core and two arms extending circumferentially away from the wedge body in opposite directions and axially along the wedge body with the two arms configured to each interact with one of the two adjacent poles such that a part of each of the two arms is radially within a portion of one of the two adjacent poles.

DETAILED DESCRIPTION OF THE DRAWINGS

Disclosed herein is a wedge for a generator rotor. The wedge bridges a gap between adjacent poles on a rotor core and provides support to the windings to help ensure the windings do not come unfurled/unwound. The wedge is light (i.e., low mass) and durable due to the wedge being one integral and monolithic piece. The wedge includes two arms that extend from the body of the wedge at two points to interact with concave portions on adjacent poles. The arms allow the wedge to absorb stresses from the poles and prevent the wedge from radial movement by positioning a portion of the wedge radially within the adjacent poles. The wedge is simple and durable because the configuration of the arms places the ends of the two arms radially within the adjacent poles such that the wedge is in tension when the generator rotor rotates at high speeds. The interaction between the arms and the poles allows for the arms to pivot and flex radially outward under elevated forces/stresses instead of breaking at the point of contact between the arms and the poles. Additionally, because the wedge is a simple one-piece configuration, the wedge can include multiple axial apertures that reduce the mass of the rotor, thus increasing the efficiency of the generator.

Figure 1:
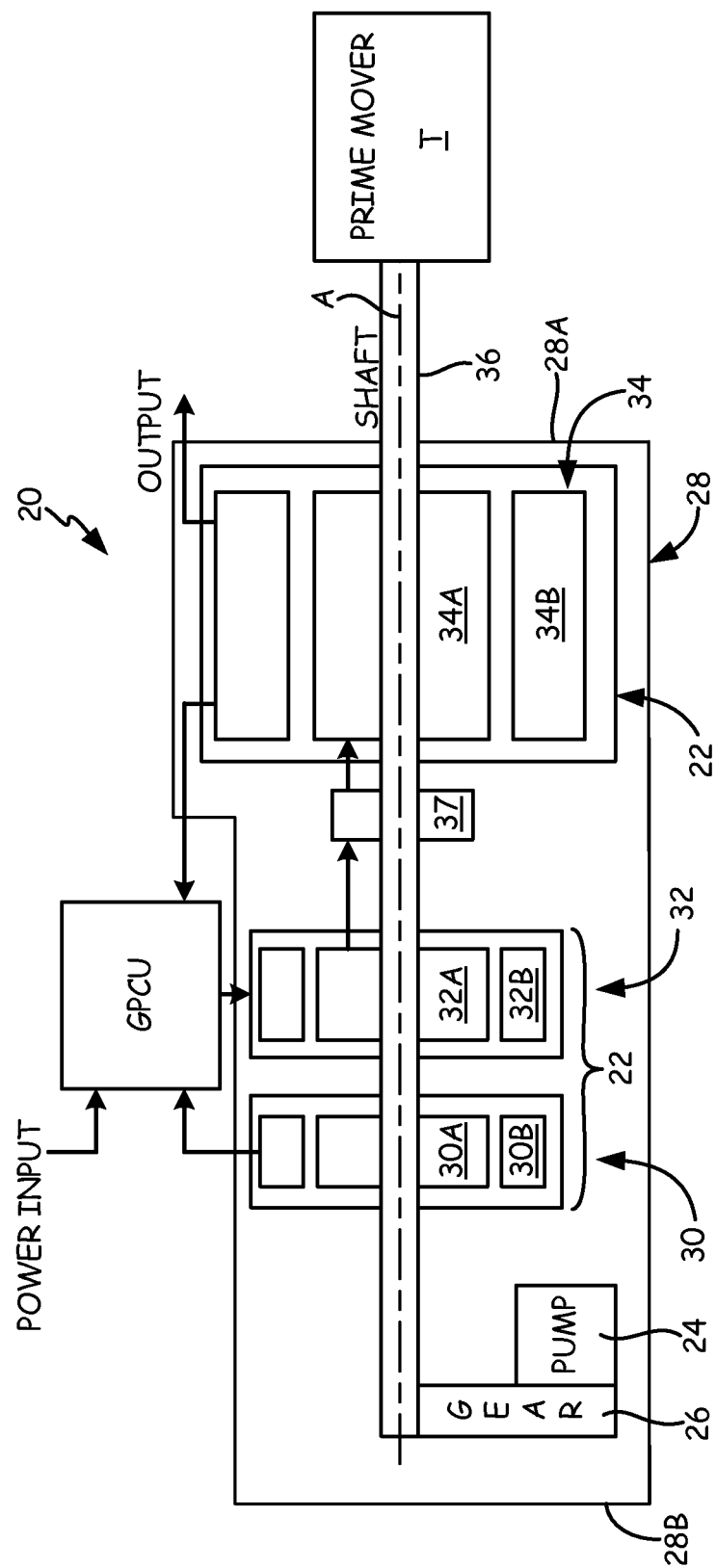
FIG. 1 is a schematic sectional view of a generator.

FIG. 1 is a general schematic sectional view of a generator. Generator 20 is driven by prime mover T, which can be, for example, a gas turbine engine. Generator 20 produces electrical energy when being driven by prime mover T. Generator 20 generally includes dynamoelectric portion 22, positive displacement pump 24, and gearbox 26, all of which are contained within housing assembly 28. Although a variable frequency generator (VFG) is illustrated in the disclosed embodiment, it should be understood that other generator systems, such as a variable frequency starter generator (VFSG) and integrated drive generator (IDG), are also within the scope of the invention.

Dynamoelectric portion 22 in the disclosed, non-limiting embodiment is a three-phase machine that includes permanent magnet generator 30, main exciter 32, and main generator 34 (the three phases) mounted along rotor shaft 36, which rotates about axis of rotation A. Permanent magnet generator 30 includes rotor assembly 30A and stator assembly 30B, main exciter 32 includes rotor assembly 32A and stator assembly 32B, and main generator 34 includes rotor assembly 34A and stator assembly 34B. Stator assemblies 30B, 32B, and 34B are installed in housing assembly 28 and do not rotate while rotor assemblies 30A, 32A, and 34A are installed on rotor shaft 36 and rotate in unison. Housing assembly 28 may be closed at one end by drive-end cover assembly 28A through which rotor shaft 36 extends and at the other end by non-drive-end cover assembly 28B through which rotor shaft 36 does not extend.

Permanent magnet generator 30, with rotor assembly 30A and stator assembly 30B, supplies power for generator excitation, as well as power for other components of an electrical system. Main exciter 32, with rotor assembly 32A and stator assembly 32B, receives field excitation from permanent magnet generator 30 through the generator power control unit (GPCU). The output of main exciter 32 is supplied to rotor mounted diode pack 37. Diode pack 37 can be divided into six diodes to provide a three-phase full wave bridge rectification. The DC current output of diode pack 37 supplies main generator 34 with electricity. Main generator 34, with rotor assembly (main rotor assembly) 34A and stator assembly (main stator assembly) 34B, outputs power to supply exterior electrical energy needs.

Figure 2:
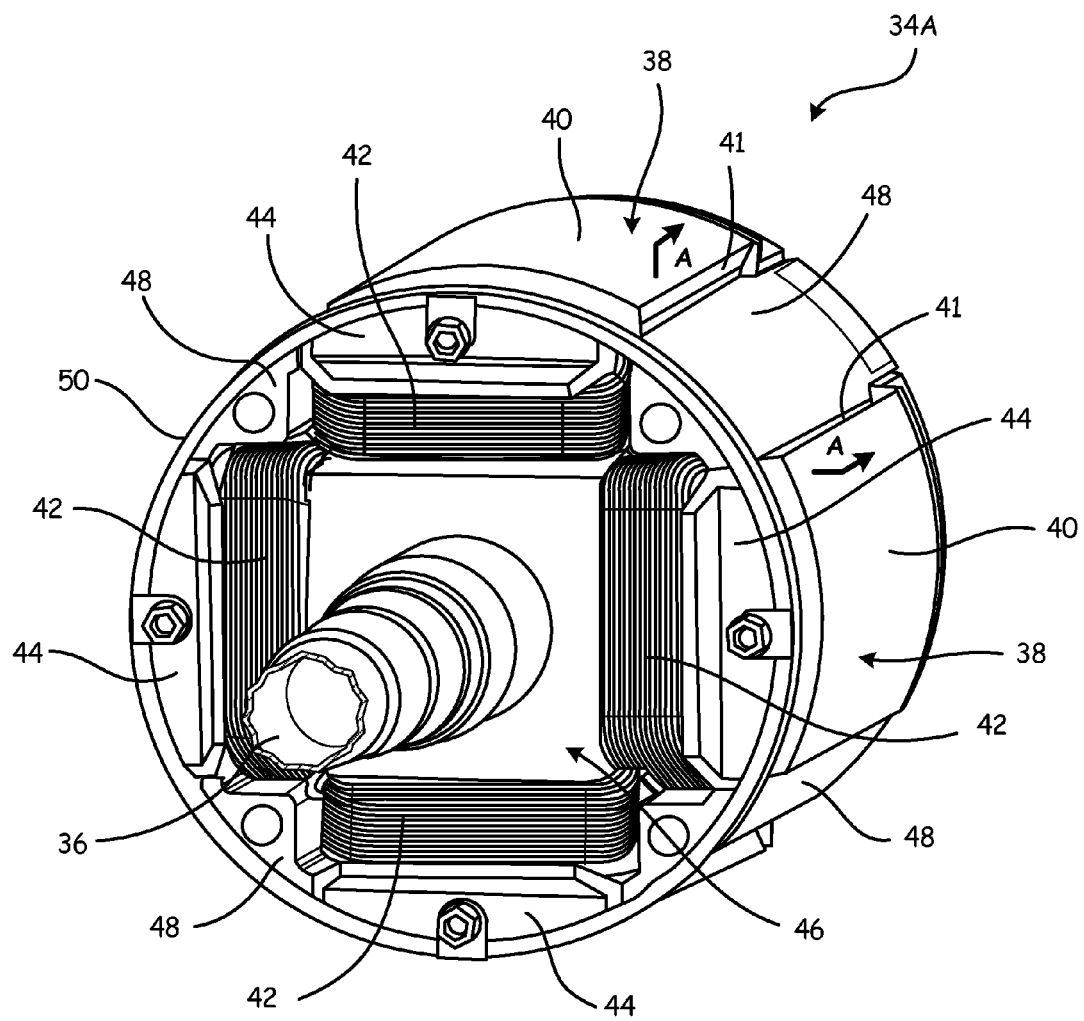
FIG. 2 is a perspective view of a main rotor assembly of the generator.

FIG. 2 is a perspective view of main rotor assembly 34A. Main rotor assembly 34A includes a portion of rotor shaft 36, rotor core 38 (which includes poles 40 having wings 41), windings 42, pole winding supports 44, end winding supports 46, wedges 48, and end bands 50.

As discussed above, main rotor assembly 34A is radially outward from and mounted on rotor shaft 36 so that main rotor assembly 34A rotates with rotor shaft 36 (which is driven by prime mover T) about axis of rotation A. Rotor shaft 36 can have a constant diameter along the axial length of rotor shaft 36 or can have a varying diameter depending on design considerations.

Rotor core 38 is radially outward from rotor shaft 36 and is the principal structural component of main rotor assembly 34A. Rotor core 38 extends axially along rotor shaft 36 and rotates in unison with rotor shaft 36. Rotor core 38 can be made from a variety of suitable materials, including metal or another material than can handle the elevated temperatures and high centrifugal forces caused by the rotation of rotor assembly 34A.

Figure 4:
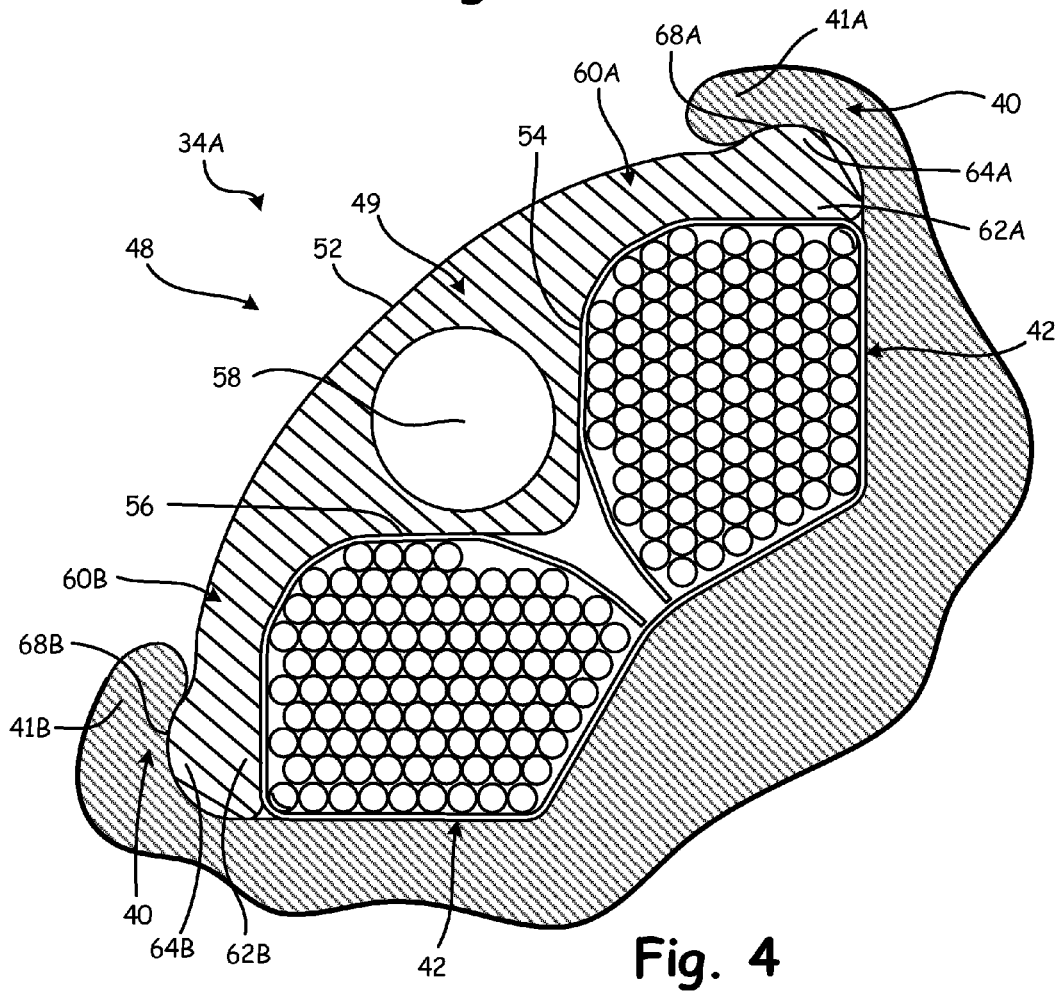
FIG. 4 is a cross-sectional view of the rotor wedge and a portion of a rotor core taken along the sectional line A-A.

Poles 40 are radially extending components of rotor core 38. Poles 40 run axially along the outer side of rotor core 38 and can span the entire axial length of rotor core 38. Poles 40 can be made from the same material as rotor core 38, and rotor core 38 and poles 40 can be made from one integral and monolithic piece or multiple pieces bonded or bolted together. While FIG. 2 shows rotor core 38 having four poles 40, rotor core 38 can have a number of different configurations that include a different number of poles 40, such as configurations that include six, eight, or ten poles 40. Poles 40 have a generally T shape with a stem (not shown in FIG. 2) that is attached to the radially inward body of rotor core 38 and wings 41 that extend circumferentially in both directions (as can be seen in FIG. 4 as first wing 41A and second wing 41B). The outer surface of poles 40 can be curved so as to reduce drag on rotor core 38 when rotor shaft 36, rotor core 38, and poles 40 are rotating at high speeds.

Wrapped around each of poles 40 are windings 42, which are each continuous wires that are electrically conductive and wrapped multiple times around poles 40. The wires of windings 42 can be arranged in a single layer on poles 40 or can be multiple layers of wires (as shown in FIG. 4). Windings 42 are each connected to diode pack 37, which provides windings 42 with DC current to cause windings 42 to become an electromagnet. When generator 20 is in operation, rotor shaft 36, rotor core 38, poles 40, and electromagnetic windings 42 rotate and induce voltage in main stator assembly 34B which can be applied to load to output electrical energy.

Pole winding supports 44 are located on each end of poles 40 and are configured to hold the ends of each of windings 42 in place. Pole winding supports 44 also function to hold end winding supports 46 in place. Pole winding supports 44 can be fastened to poles 40 by various means; including adhesive, bolts, rivets, latches, welds, or other fasteners; and can be made from a variety of materials, such as a material that is non-magnetic, including aluminum or plastic.

At each axial end of rotor core 38 (and poles 40) are end winding supports 46, which are configured to provide end support to windings 42 to help prevent the wires of windings 42 from becoming displaced due to the centrifugal forces exerted on windings 42 by the rotation of main rotor assembly 34A. End winding supports 46 can have an annular inner surface that is adjacent to rotor shaft 36 and a flat back surface that is fastened to rotor core 38 so that end winding supports 46 rotate with rotor core 38 when generator 20 is in operation. End winding supports 46 can be made from various suitable materials, including non-magnetic materials such as plastic or aluminum. End winding support 46 is fastened to rotor core 38 by various means, including adhesive, welds, bolts, rivets, latches, or other fasteners.

Wedges 48 are located between two adjacent poles 40. Each wedge 48 bridges the gap between adjacent poles 40 and provides support to windings 42 to ensure windings 42 do not become displaced during operation. The number of wedges 48 associated with main rotor assembly 34A depends on the number of poles 40, for there is at least one wedge 48 between adjacent poles 40. While FIG. 2 shows a configuration that includes four poles 40 with four wedges 48, other configurations can include a different number of poles 40 and wedges 48, such as configurations that include six, eight, or ten poles 40 and wedges 48. Each wedge 48 can be constructed from one integral and monolithic piece and can be made from various materials, including a non-magnetic material such as aluminum, titanium, or plastic. The material of wedge 48 should be suited to handle the high centrifugal forces and stresses imparted on wedge 48 by the rotation of main rotor assembly 34A and the contact of wedge 48 with poles 40 and windings 42. Wedges 48 should be strong enough to minimize deformation of wedges 48 in order to firmly hold windings 42 in place. Additionally, the material should be as light (i.e., low mass) as possible to increase the efficiency of main rotor assembly 34A.

As will be discussed in greater detail with regards to FIGS. 3 and 4, each wedge 48 has wedge body 49 that is a generally triangular cross-section that extends axially along the length of poles 40 and windings 42. While FIG. 2 shows wedges 48 as having a curved radially outer surface that conforms to the curved out surface of adjacent poles 40 so as to give main rotor assembly 34A a cylindrical shape to reduce drag, wedges 48 can also have a flat outer surface. The radially outer surface of wedge 48 can have another configuration, such as grooves or extensions, to allow for other components to be mounted to the radially outer surface of wedges 48. The two inner surfaces of wedge 48 are generally flat and are adjacent to windings 42. Wedge 48 can also include a number of axially extending apertures within wedge 48, which are intended to reduce the mass of wedge 48 to increase the efficiency of main rotor assembly 34A. Wedge 48 can have an axial length that is longer than poles 40 so that wedge 48 extends axially outward past poles 40. The portion of wedge 48 that extends outward past poles 40 is radially inward from end bands 50 so as to be adjacent to and held in place by end bands 50 (discussed below).

Wedges 48 are installed onto main rotor assembly 34A by being axially slid into place between adjacent poles 40 (end bands 50 are installed after wedges 48 are in place between poles 40). Wedges 48 are held in place on the radially outer surface by wings 41 on poles 40, which are positioned radially outward from a portion of wedge 48 (arms 60A and 60B discussed in greater detail with regards to FIGS. 3 and 4), while wedges 48 are held in place axially by end bands 50.

End bands 50 are annular rings on each end of main rotor assembly 34A. End bands 50 are the radially outermost components of main rotor assembly 34A and are configured to support pole winding supports 44 and hold wedges 48 in place. End bands 50 can each be one integral and monolithic piece or a number of rings or other components and can be made from a variety of materials, including non-magnetic materials such as aluminum, titanium, or plastic. The materials of end bands 50 should be able to handle the high centrifugal forces and stresses imparted on end bands 50 by the rotation of main rotor assembly 34A and the contact with poles 40, pole winding supports 44, and wedge 48. Like the other components of main rotor assembly 34A, end bands 50 should be as light (i.e., low mass) as possible to increase the efficiency of main rotor assembly 34A and generator 20. end bands 50 can have a rectangular cross-section or another cross-section, such as a triangular cross-section, suited to fit axially adjacent to poles 40 (and a portion of wedges 48) and radially outward from pole winding supports 44 (and a portion of wedges 48). End bands 50 can be fastened to poles 40, pole winding supports 44, and/or wedges 48 by various means, including glue, welds, bolts, rivets, latches, or other fasteners.

Figure 3:
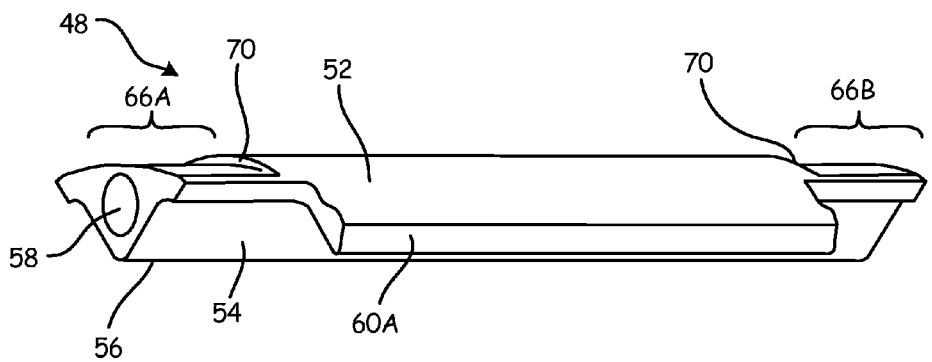
FIG. 3 is a perspective view of a rotor wedge for the main rotor assembly.

FIG. 3 is a perspective view of wedge 48, while FIG. 4 is a cross-sectional view of wedge 48 interacting with poles 40 (and first wing 41A and second wing 41B) along the sectional line A-A of FIG. 2. Wedge 48, shown in FIGS. 3 and 4, includes wedge body 49, radially outer side 52 (also called first side 52), second side 54, third side 56, aperture 58, first arm 60A, second arm 60B, first indent 66A, second indent 66B, and shoulder 70. First arm 60A includes first tip 62A and first bulge 64A, while second arm 60B includes second tip 62B and second bulge 64B. The components of main rotor assembly 34A shown in FIG. 4 include poles 40, having first wing 41A and second wing 41B, and windings 42. First wing 41A includes first concave surface 68A, while second wing 41B includes second concave surface 68B.

As discussed above, wedge 48 has a generally triangular cross-section with radially outer side 52, second side 54, and third side 56. The generally triangular cross-section makes up wedge body 49, while two circumferentially extending arms, first arm 41A and second arm 41B, make up the rest of wedge 48. Wedge 48 can also have other configurations, such as extensions, grooves, or other configurations necessary for the mounting of other components on radially outer side 52. Wedge 48 does not need to include bolts/holes or other fasteners to attach wedge 48 to main rotor assembly 34A because the arrangement of first arm 60A and second arm 60B in relation to first wing 41A and second wing 41A helps prevent wedge 48 from radial movement, while end bands 50 help prevent wedge 48 from axial movement.

Wedge 48 can include aperture 58 that extends axially along wedge 48. In the disclosed embodiment, aperture 58 is a cylindrical hole that is designed to reduce the mass of wedge 48 to increase the efficiency of generator 20. While FIGS. 2, 3, and 4 show aperture 58 as one opening, wedge 48 can include any number of apertures 58 having a variety of configurations, including one larger opening or a number of smaller openings. However, aperture 58 should not be so extensive as to compromise the structural integrity of wedge 48 so that wedge 48 does not meet the required strength and rigidity needs.

Radially outer side 52 is the radially outermost surface of wedge 48 and is shown as a generally curved surface, but can have a flat or other configuration. Radially outer side 52, along with the radially outer surfaces of first arm 60A and second arm 60B, bridges the gap between the radially outermost edges of rotor core 38/poles 40 (i.e., the space between first wing 41A and second wing 41B on adjacent poles 40). Radially outer side 52 extends along the total axial length of wedge 48 and, as shown in FIG. 3, can include first indent 66A and second indent 66B at each axial end such that wedge 48 and radially outer side 52 are not as thick near each axial end of wedge 48. First indent 66A and second indent 66B can be configured so that first indent 66A and second indent 66B are the same axial length as the width of end bands 50 so that end bands 50 firmly hold wedge 48 axially in place by being adjacent to shoulder 62 on each end of radially outer side 52. Additionally, first indent 66A and second indent 66B can be the same axial length as the distance between the axial end of wedge 48 and the point at which first arm 60A and second arm 60B begin. The axially length of first indent 66A and second indent 66B correspond to the axial length of poles 40 (and wings 41) so that the portion of radially outer side 52 between shoulder 70 is equal in length to the length of poles 40. As will be discussed below, the axial length of first arm 60A and second arm 60B corresponds to the axial length of poles 40 (and wings 41).

Second side 54 and third side 56 are the two radially inner sides of the triangular-shaped wedge body 49 and are adjacent to windings 42 on each of the adjacent poles 40. Second side 54 and third side 56 are configured to support windings 42 to ensure the individual wires of windings 42 do not become displaced during operation of generator 20. Second side 54 and third side 56 extend axially along the total length of wedge 48 and extend axially outward past poles 40 to be radially within end bands 50. Second side 54 and third side 56 can have flat surfaces or grooved surfaces in which the wires of windings 42 sit and are held in place. The interface between second side 54 and third side 56 can form a right angle in which second side 54 and third side 56 interest at a point or, as shown in FIGS. 3 and 4, the interface can be a curved surface. Second side 54 and third side 56 are flat and arranged so as to provide support to two adjacent windings 42 on one surface of windings 42, and do not push windings 42 from another direction (aside from radially inward) when rotor core 38 (and poles 40, windings 42, and wedge 48) is rotating.

At an interface between radially outer side 52 and second side 54 is first arm 60A, and at an interface between radially outer side 52 and third side 56 is second arm 60B. First arm 60A and second arm 60B are circumferential extensions that extend along the curved surface of radially outer side 52. First tip 62A of first arm 60A and second tip 62B of second arm 60B are radially inward from first wing 41A and second wing 41B of poles 40. First arm 60A and second arm 60B extend axially along wedge 48 for the axial length of wedge 48 that corresponds to the axial length of poles 40. The transition from first side 54 to first arm 60A and from second side 56 to second arm 60B (the radially inner surface of wedge 48) are shown as curved surfaces, but can be another configuration, such as a point forming a right or obtuse angle. The inner surface of first arm 60A and second arm 60B are configured to support windings 42 to ensure the individual wires of winding 42 do not become displaced during operation of generator 20 and can have flat surfaces or grooved surfaces in which the wires of windings 42 sit and are held in place.

The outer surface of first arm 60A near first tip 62A has first bulge 64B, while the outer surface of second arm 60B near second tip 62B has second bulge 64B. First bulge 64A fits into first concave surface 68A on the radially inner surface of first wing 41A so that first tip 62A is radially inward from first wing 41A, and second bulge 64B first into second concave surface 68B on the radially inner surface of second wing 41B so that second tip 62B is radially inward from second wing 41B. Because first tip 62A (along with first bulge 64A) and second tip 62B (along with second bulge 64B) are radially within first wing 41A and second wing 41B, respectively, wedge 48 is prevented from moving radially outward when main rotor assembly 34A rotates at high speeds, allowing wedge 48 to support windings 42 and keep windings 42 from becoming displaced.

As shown in FIG. 4, the surface of first tip 62A and second tip 62B are smooth and continuous with no grooves or cavities in the transition from the outer curved surface of first arm 60B and second arm 60B to first bulge 64A and second bulge 64B, respectively, and to the inner surface of each arm adjacent windings 42. Such a configuration is easier to construct and leaves a smaller surface area that could become damaged due to wear. However, if design call for it, the surface of first tip 62A and second tip 62B could include grooves or other indents.

When main rotor assembly 34A rotates, centrifugal force/stresses are exerted onto wedge 48 by windings 42, pushing wedge 48 radially outward. This force places the curved outer portion of wedge 48 (the portion between the first bulge 64A and second bulge 64B) in tension. Because first bulge 64A is not fixedly attached to first concave surface 68A and second bulge 64B is not fixedly attached to second concave surface 68B, but rather are held in place only through the interlocking of the curved geometric configurations, first tip 62A and second tip 62B can each rotate/pivot (in FIG. 4, first tip 62A would rotate clockwise while second tip 62B would rotate counterclockwise). The ability of first tip 62A (and first arm 60A) and second tip 62B (and second arm 60B) to rotate allows wedge 48 to flex radially outward, which minimizes damage that would result if first tip 62A and second tip 62B were fastened to first wing 41A and second wing 41B, respectively. The non-fastened configuration makes wedge 48 more durable and easier to install.

As discussed above, wedge 48 bridges the gap between adjacent poles 40 on rotor core 38 and provides support to windings 42 to ensure windings 42 do not come unfurled/unwound. Wedge 48 is light (i.e., low mass) due in part to aperture 58 and durable due to wedge 48 being one integral and monolithic piece. Wedge 48 includes first arm 60A (with first tip 62A and first bulge 64A) and second arm 60B (with second tip 62B and second bulge 64B) that extend from the generally triangular wedge body 49 at two points to interact with first concave surface 68A on first wing 41A and second concave surface 68B on second wing 41B. First arm 60A and second arm 60B allow wedge 48 to absorb stresses from poles 40 and prevent wedge 48 from radial movement by positioning first tip 62A and second tip 62B radially within adjacent poles 40 (within first wing 41A and second wing 41B). Wedge 48 is simple and durable because the configuration of first arm 60A and second arm 60B places first tip 62A and second tip 62B radially within adjacent poles 40 such that wedge 48 is in tension when main rotor assembly 34A rotates at high speeds. The interaction between first arm 60A and second arm 60B with poles 40 allows for first arm 60A and second arm 60B to pivot and flex radially outward under elevated forces/stresses instead of breaking at the point of contact between first bulge 64A and first concave surface 68A and at the point of contact between second bulge 64B and second concave surface 68B (which would occur if the components where fixedly attached to one another). Additionally, because wedge 48 is a simple one-piece configuration, wedge 48 can include axial aperture 58 that reduces the mass of main rotor assembly 34A, thus increasing the efficiency of generator 20.

Discussion of Possible Embodiments

The following are non-exclusive descriptions of possible embodiments of the present invention.

A wedge for use in a generator rotor includes a wedge body extending for an axial length and having a generally triangular cross-section, a first side of the wedge body extending for the axial length of the wedge body, a second side of the wedge body extending for the axial length of the wedge body and having a generally flat surface, a third side of the wedge body extending for the axial length of the wedge body and having a generally flat surface, a first arm extending circumferentially away from the wedge body at an interface between the first side and the second side and extending axially along the wedge body, and a second arm extending circumferentially away from the wedge body at an interface between the first side and the third side and extending axially along the wedge body.

The wedge of the preceding paragraph can optionally include, additionally and/or alternatively, any one or more of the following features, configurations and/or additional components:

At least one axially extending aperture in the wedge body to reduce the mass of the wedge.

An interface between the second side and third side is curved.

The wedge is constructed from a non-magnetic material.

The interface between the first arm and the second side is curved.

The interface between the second arm and the third side is curved.

The first arm and the second arm do not extend axially along a total length of the wedge body.

The first arm includes a first bulge on a radially outer surface that interacts with a concave surface on a radially inner surface of a first pole of a generator rotor.

The second arm includes a second bulge on a radially outer surface that interacts with a concave surface on a radially inner surface of a second pole of a generator rotor.

The first side of the wedge body has a generally curved surface.

A first indent located on the first side and extending from a first end of the wedge body axially inward and a second indent located on the first side and extending from a second end of the wedge body axially inward.

The wedge is a monolithic piece.

A rotor for a generator includes a shaft, a rotor core radially outward from the shaft and having a plurality of poles spanning axially along the rotor core, a plurality of windings wrapped around each of the plurality of poles, and a plurality of wedges with each wedge being positioned between two adjacent poles of the plurality of poles. Each wedge includes a wedge body having a generally triangular cross-section that extends axially along the length of the rotor core and two arms extending circumferentially away from the wedge body in opposite directions and axially along the wedge body with the two arms configured to each interact with one of the two adjacent poles such that a part of each of the two arms is radially within a portion of one of the two adjacent poles.

The rotor of the preceding paragraph can optionally include, additionally and/or alternatively, any one or more of the following features, configurations and/or additional components:

The two arms of each wedge do not extend axially along a total length of the wedge body.

The two arms of each wedge include a bulge on a radially outer surface that interact with a concave surface on a radially inner surface of each of the two adjacent poles.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A wedge for use in a generator rotor comprising:
a wedge body extending for an axial length that is greater than an axial length of a first pole and a second pole of the generator rotor, the wedge body having a generally triangular cross-section and extending between a first end and a second end;
a first side of the wedge body extending for the axial length between the first end and the second end of the wedge body;
a second side of the wedge body extending for the axial length between the first end and the second end of the wedge body and having a generally flat surface;
a third side of the wedge body extending for the axial length between the first end and the second end of the wedge body and having a generally flat surface;
a first arm extending circumferentially away from the wedge body at an interface between the first side and the second side and extending axially along the wedge body; and
a second arm extending circumferentially away from the wedge body at an interface between the first side and the third side and extending axially along the wedge body,
wherein the first arm and the second arm extend continuously for an axial length that is less than the axial length of the wedge body with the axial length of the first arm corresponding to an axial length of the first pole of the generator rotor and the axial length of the second arm corresponds to an axial length of the second pole of the generator rotor.

2. The wedge of claim 1, further comprising:
at least one axially extending aperture in the wedge body to reduce the mass of the wedge.

3. The wedge of claim 1, wherein an interface between the second side and third side is curved.

4. The wedge of claim 1, wherein the wedge is constructed from a non-magnetic material.

5. The wedge of claim 1, wherein the interface between the first arm and the second side is curved.

6. The wedge of claim 1, wherein the interface between the second arm and the third side is curved.

7. The wedge of claim 1, wherein the first arm includes a first bulge on a radially outer surface that interacts with a concave surface on a radially inner surface of the first pole of the generator rotor.

8. The wedge of claim 1, wherein the second arm includes a second bulge on a radially outer surface that interacts with a concave surface on a radially inner surface of the second pole of the generator rotor.

9. The wedge of claim 1, wherein the first side of the wedge body has a generally curved surface.

10. The wedge of claim 1, further comprising:
a first indent located on the first side and extending from the first end of the wedge body axially inward; and
a second indent located on the first side and extending from the second end of the wedge body axially inward.

11. The wedge of claim 10, wherein the first indent extends from the first end of the wedge body axially inward to a point where the first arm and the second arm begin and the second indent extends axially inward from the second end of the wedge body to a point where the first arm and the second arm end.

12. The wedge of claim 1, wherein the wedge is a monolithic piece.

13. The wedge of claim 1, wherein the second side of the wedge body is perpendicular to the third side of the wedge body.

14. The wedge of claim 1, wherein the second side of the wedge body is in contact with a first winding wrapped around the first pole and the third side of the wedge body is in contact with a second winding wrapped around the second pole.

15. A rotor for a generator comprising:
a shaft;
a rotor core radially outward from the shaft and having a plurality of poles spanning axially along the rotor core;
a plurality of windings wrapped around each of the plurality of poles; and
a plurality of wedges, each wedge being positioned between two adjacent poles of the plurality of poles, each wedge comprising:
a wedge body having a generally triangular cross-section and a length that extends axially along a length of the rotor core that is greater than a length of the plurality of poles; and
two arms extending circumferentially away from the wedge body in opposite directions and axially along the wedge body, the two arms configured to each interact with one of the two adjacent poles such that a part of each of the two arms is radially within a portion of one of the two adjacent poles,
wherein the two arms of each wedge extend an axial length of the wedge body that is equal to an axial length of each of the two adjacent poles.

16. The rotor of claim 15, wherein the two arms of each wedge include a bulge on a radially outer surface that interact with a concave surface on a radially inner surface of each of the two adjacent poles.

17. The rotor of claim 15, wherein the wedge body includes a first side, a second side, and a third side with the second side in contact with one winding wrapped around one of the plurality of poles and the third side in contact with another winding wrapped around another of the plurality of poles.

18. The rotor of claim 17, wherein the second side is perpendicular to the third side.

* * * * *